UNITED STATES PATENT OFFICE.

JULIUS EDMUND DOTCH AND EDWARD DUEMPELMAN, OF WASHINGTON, DISTRICT OF COLUMBIA.

IMPROVED COMPOSITION FOR PAVEMENTS, ROOFING, AND FOR OTHER PURPOSES.

Specification forming part of Letters Patent No. 90,084, dated May 18, 1869.

*To all whom it may concern:*

Be it known that we, JULIUS EDMUND DOTCH and EDWARD DUEMPELMAN, of the city of Washington, District of Columbia, have invented a new and Improved Cement for Pavements and Roofing, and for other technical purposes where cement is used, as for the manufacture of pipes, buckets for the use of billiard-tables, insulators, &c.; and we do hereby declare that the following is a full and exact description thereof.

The nature of the invention consists in vulcanizing pure asphaltum alone, or pure asphaltum mixed with coal-tar or wood-tar and elaterite, to which is added either powdered slate or brick-dust, or any other kind of mineral substance.

To enable others skilled in the art to make or use our invention, we will proceed to describe its operation.

We first make the pure asphaltum or the mixture of asphaltum with coal-tar or wood-tar and elaterite, free from water, by evaporation, and we then vulcanize it with the sulphur. When the thorough vulcanization with the sulphur or gas-lime is effected, we put in the slate, brick-dust, or sand, or other substances.

Foundations for pavements we construct by mixing broken stones, pebbles, gravel, &c., with our vulcanized composition in a thinner state by mixing it with boiled linseed-oil or naphthaline, to give it more elasticity, on the top of which, after being rammed down, we put our vulcanized cement, as described above, or we use, instead of this, beton as a foundation.

For roofing purposes we employ pasteboard or felt, &c., saturated with our vulcanized composition, or we spread it directly on boards, tin, &c., which we first cover with prepared clay or with slaked lime mixed with sand, and on the top of which we put our vulcanized roofing-cement, or we first impregnate the boards with a mixture of equal parts of pitch, tar, and chalk. We also make, from this vulcanized concrete, slates of various sizes, which we do not fasten by nails to the roof, but by movable hooks, about two inches long, which are soldered to conically-formed zinc plates 4 to 6 inches long. The slates are kept in that way securely between the hook and zinc plate, and can be removed simply and with the greatest facility by turning the hook, so that one or more of the slates can be taken out for repair or new ones inserted without interfering with the rest. This method gives also greater security to the roof against storms, &c., than any other method of fastening.

For the manufacture of pipes, buckets, &c., we saturate pasteboard, felt, &c., with our vulcanized composition.

For the manufacture of tiles, blocks, slates, &c., we cast the melted vulcanized concrete into forms, and give it more additional strength by compression while yet warm.

For the use of water-proof walls we impregnate porous stones, first heated, with our vulcanized composition. We also use it for insulators for telegraphs and batteries as substitutes for glass.

We have attained a more thorough vulcanization by treating our carbon hydrogen combinations either with chloride of sulphur or by dissolving first the sulphur in napthaline or in oil of turpentine.

When we have to prepare new foundations, we make them of concretes with broken materials, in the usual way, or when pavements or macadams have already been laid, we simply spread our mass on the old surface, in the manner described in Alexander Happey's English patent of the 25th of April, 1838, No. 7,226, sections 10 to 35 inclusive.

What we claim as our invention, and desire to secure by Letters Patent, is—

1. The improved method of treating pure asphaltum, either alone or mixed with coal-tar, brick-dust, or sand, substantially as and for the purposes described.

2. The foundation for pavements prepared substantially as herein described.

3. The method of fastening tiles to roofs as herein described.

JULIUS EDMUND DOTCH.
   EDWARD DUEMPELMAN.

Witnesses:
 J. P. KLINGLE,
 THOMAS C. CONNOLLY.